United States Patent [19]

Coughlan

[11] Patent Number: 5,167,705
[45] Date of Patent: Dec. 1, 1992

[54] HIGH OPACITY, THIN COAT CONCEPT AIRPORT RUNWAY LINE-MARKING PAINTS

[76] Inventor: Thomas N. Coughlan, Ashleaf House, Iona Road, Montenotte, Cork, Ireland

[21] Appl. No.: 670,009

[22] Filed: Mar. 15, 1991

[30] Foreign Application Priority Data

Mar. 16, 1990 [IE] Ireland .................. 959/90

[51] Int. Cl.⁵ .................................. C09K 3/14
[52] U.S. Cl. ........................ 106/36; 106/436; 427/137
[58] Field of Search ................. 106/36; 427/137

[56] References Cited

U.S. PATENT DOCUMENTS

| | | | |
|---|---|---|---|
| Re. 30,463 | 10/1980 | Miller et al. | 206/22 CQ |
| 2,574,971 | 11/1951 | Heltzer | 106/228 |
| 3,005,790 | 10/1961 | Wynn | 260/22 |
| 3,474,057 | 10/1969 | de Vries | 427/137 |
| 3,900,605 | 8/1975 | Norris, Jr. | 427/137 |
| 4,105,808 | 8/1978 | McKenzie | 427/137 |

*Primary Examiner*—William R. Dixon, Jr.
*Assistant Examiner*—Margaret V. Einsmann
*Attorney, Agent, or Firm*—Pollock, Vande Sande & Priddy

[57] ABSTRACT

Conventionally, paints which are formulated for use as markings on roads have also been used as markings on airport runways but have been found unsatisfactory since airport runway markings have special requirements. The present invention provides a super-high opacity thin coat concept airport runway marking paint comprising 25–75% by weight of titanium dioxide in the paint, extenders such as Barium Sulphate, Laminar Talc, Calcite or Dolomite used alone or as blends thereof, binders such as Plasticized Chlorinated Rubber, Acrylated rubber, Epoxy, Polyurethane or emulsified resins and an anti-skid aggregate comprising crushed glass particles or calcined Aluminum oxide or the like. Airport runway markings need frequent maintenance re-application of paint in order to obliterate the black markings left after contact with aircraft tires. The super-high opacity paint has the advantage that it can be sprayed on at very thin film thickness thereby minimizing the tendency of the build up of thick smooth film to potentially hazardous levels.

12 Claims, No Drawings

HIGH OPACITY, THIN COAT CONCEPT AIRPORT RUNWAY LINE-MARKING PAINTS

The present invention relates to a high opacity, thin coat concept airport runway line-marking paint particularly for use on aircraft runways.

Aircraft runways generally have white line-markings applied intermittently on the centre along the entire of their length and also a continuous line along each side. Usually, these lines are approximately one meter wide.

In addition, there are intermittent large "block" markings outlining the touch-down zone at each end of the runway. These markings are necessary in order to provide clear visibility of the runway and to assist a pilot in calculating distance factors for "touch down" and "take off" of his aircraft.

There is a requirement that runway surfaces be tested for skid-resistance and therefore most modern runways have a specially designed "friction course" on the runway in order to comply with safety regulations. It follows that the white-line paint markings should not affect the inherent safety features of the runway surface.

Conventional public road-marking paints are often used in the application of white line markings to runways. Sometimes these conventional paints incorporate spherical glass beads. The beads which are included at the application stage of such conventional road paints are used in order to increase light reflectance which is desirable from the point of view of a motorist but not necessarily from a pilot's point of view. In fact, the presence of such beads in runway line-markings has the disadvantage that it results in a low-friction factor on the paint coating which may induce a skid with potentially serious adverse consequences.

Conventional road-marking paints are generally formulated with the intention that they will be applied as a relatively thick film. A typical roadway paint formulation contains rather low levels of Titanium dioxide, approximately 10-16% weight of Titanium dioxide to total weight of paint. The dry film thickness is usually specified by paint manufacturers as being between 150 microns and 300 microns following spray application. The dry film thickness of conventional road markings in many urban areas can be as high as 2000 microns, the emphasis being on the provision of durable, thick coats. This comparatively high dry film thickness is used on roads in order to obtain high durability against the eroding effects of traffic and harsh weather conditions.

However, runway markings generally need frequent re-application in any case because of blackening caused by the aircraft tires. This "black soiling" problem occurs long before the paint has eroded and frequent re-application is necessary in order to maintain the high level of whiteness and visibility expected of such markings. It has been found at some airports that centreline maintenance repainting was necessary every two to four weeks due to the "black soiling" problem caused by a heavy volume of aircraft traffic.

Thus, the use on aircraft runways of conventional road marking paints which are formulated primarily with different design requirements in mind has the disadvantage that frequent re-application results in the line thickness rapidly building up to an unacceptably high level. This has the added disadvantage that cracking and spalling of thick coatings then occurs and also causes the line to develop a smooth slippery surface.

The present invention seeks to alleviate the disadvantages associated with known paints used on airport runways.

The present invention accordingly provides a super-high opacity thin coat concept airport runway line-marking paint comprising at least one binder and an opacifying white pigment in a concentration range, the lower limit of which is 25% w/w (weight of pure pigment to total weight of paint) and the upper limit of which is determined by being adequately bound and within the critical pigment volume concentration of the paint.

The present invention further provides a super-high opacity, thin coat concept airport runway line-marking paint comprising an opacifying white pigment in a concentration range of between 25% w/w and 60% w/w (weight of pure pigment to total weight of paint), at least one binder in a concentration range of 18-21% w/w and at least one mineral extender pigment in a concentration range of 5-22% w/w.

The present invention further provides a super-high opacity, thin coat concept airport runway line-marking paint comprising an opacifying white pigment in a concentration range of between 25% w/w and 60% w/w (weight of pure pigment to total weight of paint), at least one mineral extender pigment in a concentration range of 5-22% w/w, at least one binder in a concentration range of 18-21% w/w and a solvent system in a concentration range of 28-32% w/w.

Ideally, the paint includes an anti-skid aggregate comprises crushed glass particles or calcined aluminum oxide or the like.

The binders may be any one of the following group: Plasticised Chlorinated Rubbers, Acrylated Rubbers, Epoxy Resins, Polyurethane Resins, emulsified resin.

The binder is preferably based on a durable plasticised chlorinated rubber medium, (unmodified, non-convertible type).

Advantageously, the binder concentration is related to a nominal pigment volume concentration (P.V.C.) range of between 48% and 55% which is within the critical pigment volume concentration (C.P.V.C.).

Ideally, the said mineral extender pigment comprises any one of the following group: Barium Sulphate, Laminar Talc, Calcite or Dolomite, or a blend thereof.

Preferably the opacifying white pigment used is Titanium dioxide, and is included in the formulation as a good commercial grade Rutile form of the pigment having a minimum of 97% weight of Titanium dioxide to weight of pigment; the balance being made up with suitable surface treatments.

The concentration of Titanium dioxide in the paint is preferably between 30% and 35% w/w based on the total weight of paint.

However, the invention also allows for higher opacity versions of the paint, preferably containing 45% to 50% w/w Titanium dioxide of the type as above.

The special high opacity feature allows the paint to be applied as an exceptionally thin maintenance coating, which in turn confers material cost savings and also improved safety and technical features.

A thin film (approximately 40-45 microns dry film thickness) of the new high opacity paint is sufficient to just obliterate "black soiling".

Advantageously, a thin film of approximately 30-35 microns (dry film thickness) can be applied with suitable obliterating properties if a higher opacity version of the paint according to the invention is used.

The high opacity paint according to the invention has good adhesion to a substrate, good intercoat adhesion and also good cohesion within "compound coatings" of itself, up to approximately 2000 microns (dry film thickness).

Preferably, the crushed glass particles comprising the anti-skid additive aggregate are colourless and the calcined Aluminium oxide is white or near white in the dry state.

Advantageously, the particle size range of the glass particles or Calcined Aluminium oxide may be between approximately 150–300 microns. Alternatively the particle size of the glass particles or calcined aluminium oxide may be in the range 300–600 microns.

The rate of addition of the anti-skid additive in the line markings is 1–2 kgs per 5 liters of paint, added on certain occasions of repainting only.

The high opacity paint according to the invention, advantageously comprises a solvent system which allows for very quick drying of the paint (approximately 2 minutes dry). This has the advantage that maintenance work can be carried out very quickly and results in minimal interference to flight schedules at busy airports. Furthermore, the quick drying characteristic of the high opacity paint allows maintenance work to be carried out even when uncertain weather condition prevail.

In one embodiment, the solvent system comprises Butan-2-one (known in Industry as Methyl Ethyl Ketone) and Toluene.

In a separate embodiment, the solvent system comprises solvents such as 3,3-Dimethyl butan-2-one (also known as Methyl Isobutyl Ketone} and Xylene for slower evaporation which may be required in hot climatic conditions.

The paint according to the invention may comprise additives such as strongly polar solvents or the like which facilitate paint application to damp (not wet) surfaces.

The solvent system thus confers some tolerance to surface dampness (not wet) due to the polar solvent content. Other speciality chemicals may be included for surface dampness conditions. Such speciality chemicals are known for the purpose and are commercially available.

In each of the above embodiments, the high opacity paint has substantially the same properties such as viscosity, rheology and P.V.C. The viscosity of a typical formulation is 6.5–7.0 Poisies as measured on the ICI Rotothinner* viscometer at 25° C. The paint according to the invention has thixotropic or mild gel characteristics in order to preclude pigment settlement during storage. The paint is formulated such that it is suitable for application by existing spray machinery. Advantageously, precision-film-thickness spray application machinery such as Hofmann's Amokos* system may be employed. For spray application purposes, thinners may be included in the amount of 25% v/v and comprise blends of the solvents already included in the formulation and in the same proportions. The thinners, should be included in the paint formulation just before application to the runway surface. * Amokos and Rotothinner are Trade Marks.

It has been found that paint according to the invention, when sprayed correctly at very thin films, minimises the tendency for rapid build up of thick smooth films to potentially hazardous levels, and thus that the paint lines do not detract from the required friction standards of the runway.

Use of the paint according to the invention has substantial economic advantage since only about one third of the film thickness of many conventional road linemarking coatings is required. The material cost per liter of the proposed new paint is marginally higher than that of "conventional" road marking paint due to the "high opacity" formulation of the former, but this material cost is very much offset by savings accrued as a result of much lower volume usage.

The invention will now be described more particularly with reference to the following non-restrictive examples:

EXAMPLE 1

| | COMPOSITION % by weight |
|---|---|
| Titanium Dioxide Pigment: (preferred Rutile Type 97% min. Tio$_2$) | 30%–35% |
| MINERAL EXTENDER PIGMENTS: such as Barium Sulphate, Laminar Talc, Calcite or Dolomite, either alone or as blends thereof. (Calcite/Dolomite max. 10% in paint) | 18%–22% |
| BINDER (SOLIDS) Plasticised Chlorinated Rubber preferred | 18%–21% |
| Typical Composition;     Ratio | |
| I.C.I. "Alloprene" R10*    1.00 to 1.50 | |
| I.C.I. Cereclor 70*    0.50 | |
| I.C.I. Cereclor 48*    0.50 | |
| or approved equivalents | |
| VOLATILE/SOLVENTS SYSTEM | 28%–32% |
| Composition:     Ratio | |
| Methyl Ethyl Ketone    1.00 | |
| Toluene    2.00 | |
| ADDITIVES | |
| Surfactant/wetting Agent: e.g. Lecithin | 0.25–0.50% |
| Structuring/suspending agent; e.g. Bentone 27* or/and Armogel* | 0.50–1.00% |
| Acid Stabilizer/Epoxidised Soya Oil e.g. Edenol D81* | 1.00% |
| ANTI-SKID AGGREGATE; | |
| i.e. Crushed Colourless Glass Particles (Typical sizes) | |
| a. Sizes within the particle-size range of circa 150 up to 300 microns. | |
| or | |
| b. As above within the size range of circa 300 up to 600 microns. | |
| OR ALTERNATIVELY: | |
| c. Cacined Aluminium Oxide (white or near white) (typical sizes) | |
| or | |
| Circa 150 up to 300 microns particle range. | |
| d. Calcined Aluminium Oxide (white or near white), within the Particle size range of Circa 300 up to 600 microns. | |

*Alloprene, Cereclor, Bentone 27, Armogel and Edenol D81 are Trade Marks.

EXAMPLE 2

| | COMPOSITION % by weight |
|---|---|
| Titanium Dioxide Pigment: (preferred Rutile type 97% min. TiO$_2$) | 30%–35% |
| MINERAL EXTENDER PIGMENTS: such as Barium Sulphate, Laminar Talc, Calcite or Dolomite, either alone or as blends thereof. (Calcite/Dolomite max. 10% in paint) | 18%–22% |
| BINDER (SOLIDS) Plasticised Chlorinated Rubber preferred | 18%–21% |

-continued

| Typical Composition; | Ratio | COMPOSITION % by weight |
|---|---|---|
| I.C.I. "Alloprene" R10 | 1.00 to 1.50 | |
| I.C.I. Cereclor 70 | 0.50 | |
| I.C.I. Cereclor 48 | 0.50 | |
| (or approved equivalents) | | |
| VOLATILE/SOLVENTS SYSTEM | | 28%–32% |
| Such as: | Ratio | |
| Methyl IsoButyl ketone | 1.00 | |
| Xylene | 2.00 | |
| ADDITIVES | | |
| Surfactant/wetting Agent: | | 0.25–0.50% |
| e.g. Lecithin | | |
| Structuring/suspending agent; | | 0.50–1.00% |
| e.g. Bentone 27 or/and Armogel | | |
| Acid Stabilizer/Epoxidised Soya Oil | | 1.00% |
| e.g. Edenol D81 | | |
| ANTI-SKID AGGREGATE: | | | i.e. Crushed Colourless Glass Particles (Typical sizes)
a. Sizes within the particle-size range of circa 150 up to 300 microns.
or
b. As above within the size range of circa 300 up to 600 microns.
OR ALTERNATIVELY:
c. Cacined Aluminium Oxide (white or near white) (typical sizes)
Circa 150 up to 300 microns particle range.
or
d. Calcined Aluminium Oxide (white or near white), within the Particle size range of Circa 300 up to 600 microns.

EXAMPLE 3

| | COMPOSITION % by weight |
|---|---|
| Titanium Dioxide Pigment: | 45–50% |
| (preferred Rutile type 97% min. TiO$_2$) | |
| MINERAL EXTENDER PIGMENTS: | 5–15% |
| such as | |
| Barium Sulphate, Laminar Talc, Calcite | |
| or Dolomite, either alone or as blends thereof. | |
| (Calcite/Dolomite max. 10% in paint) | |
| BINDER (SOLIDS) | 18%–21% |
| Plasticised Chlorinated Rubber preferred | |

| Typical Composition; | Ratio | |
|---|---|---|
| I.C.I. "Alloprene" R10 | 1.00 to 1.50 | |
| I.C.I. Cereclor 70 | 0.50 | |
| I.C.I. Cereclor 48 | 0.50 | |
| VOLATILE/SOLVENTS SYSTEM | | 28%–32% |
| Composition: | Ratio | |
| Methyl Ethyl Ketone | 1.00 | |
| Toluene | 2.00 | |
| ADDITIVES | | |
| Surfactant/wetting Agent: | | 0.25–0.50% |
| e.g. Lecithin | | |
| Structuring/suspending agent; | | 0.50–1.00% |
| e.g. Bentone 27 or/and Armogel | | |
| Acid Stabilizer/Epoxidised Soya Oil | | 1.00% |
| e.g. Edenol D81 | | |
| ANTI-SKID AGGREGATE: | | | i.e. Crushed Colourless Glass Particles (Typical sizes)
a. Sizes within the particle-size range of circa 150 up to 300 microns.
or
b. As above within the size range of circa 300 up to 600 microns.
OR ALTERNATIVELY:
c. Cacined Aluminium Oxide (white or near white) (typical sizes)
Circa 150 up to 300 microns particle range.
or
d. Calcined Aluminium Oxide (white or near white), within the Particle size range of Circa 300 up to 600 microns.

EXAMPLE 4

(for use in hot climatic conditions)

| | COMPOSITION % by weight |
|---|---|
| Titanium Dioxide Pigment: | 45%–50% |
| (preferred Rutile type 97% min. TiO$_2$) | |
| MINERAL EXTENDER PIGMENTS: | 5%–15% |
| such as | |
| Barium Sulphate, Laminar Talc, Calcite | |
| or Dolomite, either alone or as blends thereof. | |
| (Calcite/Dolomite max. 10% in paint) | |
| BINDER (SOLIDS) | 18%–21% |
| Plasticised Chlorinated Rubber preferred | |

| Typical Composition; | Ratio | |
|---|---|---|
| I.C.I. "Alloprene" R10 | 1.00 to 1.50 | |
| I.C.I. Cereclor 70 | 0.50 | |
| I.C.I. Cereclor 48 | 0.50 | |
| VOLATILE/SOLVENTS SYSTEM | | 28%–32% |
| Such as: | Ratio | |
| Methyl IsoButyl ketone | 1.00 | |
| Xylene | 2.00 | |
| ADDITIVES | | |
| Surfactant/wetting Agent: | | 0.25–0.50% |
| e.g. Lecithin | | |
| Structuring/suspending agent; | | 0.50–1.00% |
| e.g. Bentone 27 or/and Armogel | | 0.50–1.00% |
| Acid Stabilizer/Epoxidised Soya Oil | | 1.00% |
| e.g. Edenol D81 | | |
| ANTI-SKID AGGREGATE: | | | i.e. Crushed Colourless Glass Particles (Typical sizes)
a. Sizes within the particle-size range of circa 150 up to 300 microns.
or
b. As above within the size range of circa 300 up to 600 microns.
OR ALTERNATIVES:
c. Cacined Aluminium Oxide (white or near white) (typical sizes)
Circa 150 up to 300 microns particle range.
or
d. Calcined Aluminium Oxide (white or near white), within the Particle size range of Circa 300 up to 600 microns.

I claim:

1. A super-high opacity, thin coat concept airport runway line-marking paint comprising at least one binder and an opacifying titanium dioxide white pigment in a concentration range, the lower limit of which is 25% w/w weight of pure pigment to total weight of paint, and the upper limit of which is determined by being adequately bound and within the critical pigment volume concentration of the paint.

2. A super-high opacity, thin coat concept airport runway line-marking paint comprising an opacifying titanium dioxide white pigment in a concentration range of between 25% w/w and 60% w/w, weight of pure pigment to total weight of paint, at least one binder in a concentration range of 18–21% w/w and at least one mineral extender pigment in a concentration range of 5–22% w/w.

3. A super-high opacity, thin coat concept airport runway line-marking paint comprising an opacifying white pigment in a concentration range of between 25% w/w and 49% w/w, weight of pure pigment to total weight of paint, at least one mineral extender pigment in a concentration range of 5-22% w/w, at least one binder in a concentration range of 18-21% w/w and a solvent system in a concentration range of 28-32% w/w.

4. A paint according to claim 3 wherein the opacifying white pigment is titanium dioxide.

5. A paint according to claim 3, wherein the paint further comprises an anti-skid aggregate.

6. A paint according to claim 5, wherein the anti-skid aggregate comprises crushed glass particles or calcined aluminum oxide.

7. A paint according to claim 3, wherein titanium dioxide is present in the paint in a concentration range of between 30 and 50% w/w.

8. A paint according to claim 3, wherein the solvent system comprises butan-2-one and toluene.

9. A paint according to claim 3, wherein the solvent system comprises 3,3-dimethyl butan-2-one and xylene.

10. A paint according to claim 1, wherein the said binder is any selected from group consisting of:
plasticized chlorinated rubbers, acrylated rubbers, epoxy resins and polyurethane resins.

11. A paint according to claim 2, wherein the said mineral extender pigment is selected from the group consisting of:
barium sulphate, laminar talc, calcite and dolomite.

12. A paint according to claim 3, wherein the said mineral extender pigment comprises a blend of at least two members selected from the group consisting of:
barium sulphate, laminar talc, calcite and dolomite.

* * * * *